United States Patent
Asadi et al.

(10) Patent No.: US 11,210,125 B2
(45) Date of Patent: Dec. 28, 2021

(54) CACHE ALLOCATION TO A VIRTUAL MACHINE

(71) Applicants: Hossein Asadi, Tehran (IR); Saba Ahmadiankhameneh, Tehran (IR)

(72) Inventors: Hossein Asadi, Tehran (IR); Saba Ahmadiankhameneh, Tehran (IR)

(73) Assignee: Hossein Asadi, Tehran (IR)

( * ) Notice: Subject to any disclaimer, the term of this patent is extended or adjusted under 35 U.S.C. 154(b) by 175 days.

(21) Appl. No.: 16/252,584

(22) Filed: Jan. 19, 2019

(65) Prior Publication Data

US 2019/0155638 A1 May 23, 2019

Related U.S. Application Data

(60) Provisional application No. 62/619,179, filed on Jan. 19, 2018.

(51) Int. Cl.
*G06F 9/455* (2018.01)
*G06F 12/06* (2006.01)

(52) U.S. Cl.
CPC ...... *G06F 9/45558* (2013.01); *G06F 12/0646* (2013.01); *G06F 2009/45583* (2013.01); *G06F 2212/1041* (2013.01); *G06F 2212/152* (2013.01)

(58) Field of Classification Search
None
See application file for complete search history.

(56) References Cited

U.S. PATENT DOCUMENTS

| | | | |
|---|---|---|---|
| 9,329,896 B2 * | 5/2016 | Manpathak | G06F 12/0871 |
| 9,418,020 B2 | 8/2016 | Waldspurger et al. | |
| 9,639,480 B2 | 5/2017 | Waldspurger et al. | |
| 9,984,004 B1 * | 5/2018 | Little | G06F 12/0811 |
| 2008/0244533 A1 * | 10/2008 | Berg | G06F 11/3447 717/128 |
| 2014/0156910 A1 * | 6/2014 | Uttamchandani | G06F 3/0685 711/103 |

(Continued)

FOREIGN PATENT DOCUMENTS

CN 105677792 6/2016

OTHER PUBLICATIONS

D. Eklov and E. Hagersten, "StatStack: Efficient modeling of LRU caches," 2010 IEEE International Symposium on Performance Analysis of Systems & Software (ISPASS), White Plains, NY, 2010, pp. 55-65, doi: 10.1109/ISPASS.2010.5452069. (Year: 2010).*

(Continued)

*Primary Examiner* — Andrew M. Lyons
(74) *Attorney, Agent, or Firm* — Bajwa IP Law Firm; Haris Zaheer Bajwa

(57) ABSTRACT

A method for cache allocation to a plurality of virtual machines. The method includes sequentially receiving a sequence of requests, detecting a plurality of access sequences to a plurality of data elements, calculating a reuse distance of a plurality of reuse distances by calculating a number of distinctive data elements of the plurality of data elements, estimating an optimal cache size based on the plurality of reuse distances, and assigning the optimal cache size to a virtual machine. Each request of the sequence of requests is associated with an access of a plurality of accesses to the data element. The plurality of accesses include a plurality of read accesses and a plurality of write accesses.

20 Claims, 6 Drawing Sheets

(56) References Cited

U.S. PATENT DOCUMENTS

| | | | | |
|---|---|---|---|---|
| 2014/0173227 | A1* | 6/2014 | Min | G06F 3/0644 711/159 |
| 2014/0281265 | A1* | 9/2014 | Atkisson | G06F 12/0806 711/136 |
| 2014/0310462 | A1* | 10/2014 | Waldspurger | G06F 17/40 711/118 |
| 2014/0344504 | A1* | 11/2014 | Luo | G06F 12/0842 711/103 |
| 2015/0067262 | A1* | 3/2015 | Uttamchandani | G06F 9/5077 711/129 |
| 2015/0363236 | A1* | 12/2015 | Manpathak | G06F 12/122 711/160 |
| 2016/0140052 | A1* | 5/2016 | Waldspurger | G06F 12/0893 711/129 |
| 2016/0147631 | A1* | 5/2016 | Magdon-Ismail | G06F 11/3461 718/100 |
| 2017/0206164 | A1* | 7/2017 | Choi | G06F 11/3452 |
| 2018/0067961 | A1* | 3/2018 | Yang | G06F 16/188 |

OTHER PUBLICATIONS

Q. Lu, J. Lin, X. Ding, Z. Zhang, X. Zhang and P. Sadayappan, "Soft-OLP: Improving Hardware Cache Performance through Software-Controlled Object-Level Partitioning," 2009 18th International Conference on Parallel Architectures and Compilation Techniques, Raleigh, NC, 2009, pp. 246-257. (Year: 2009).*

Q. Niu, J. Dinan, Q. Lu and P. Sadayappan, "PARDA: A Fast Parallel Reuse Distance Analysis Algorithm," 2012 IEEE 26th International Parallel and Distributed Processing Symposium, Shanghai, 2012, pp. 1284-1294, doi: 10.1109/IPDPS.2012.117. (Year: 2012).*

S. Tavarageri and P. Sadayappan, "A Compiler Analysis to Determine Useful Cache Size for Energy Efficiency," 2013 IEEE International Symposium on Parallel & Distributed Processing, Workshops and Phd Forum, Cambridge, MA, 2013, pp. 923-930. (Year: 2013).*

Wikipedia, "Hypervisor," last retrieved from https://en.wikipedia.org/wiki/Hypervisor on Nov. 21, 2020. (Year: 2020).*

W. Ding, J. Liu, M. Kandemir and M. J. Irwin, "Reshaping cache misses to improve row-buffer locality in multicore systems," Proceedings of the 22nd International Conference on Parallel Architectures and Compilation Techniques, 2013, pp. 235-244. (Year: 2013).*

Q. Niu, J. Dinan, Q. Lu and P. Sadayappan, "PARDA: A Fast Parallel Reuse Distance Analysis Algorithm," 2012 IEEE 26th International Parallel and Distributed Processing Symposium, 2012, pp. 1284-1294. (Year: 2012).*

S. Rajasekaran, S. Duan, W. Zhang and T. Wood, "Multi-cache: Dynamic, Efficient Partitioning for Multi-tier Caches in Consolidated VM Environments," 2016 IEEE International Conference on Cloud Engineering (IC2E), 2016, pp. 182-191. (Year: 2016).*

H. Shim, B. Seo, J. Kim and S. Maeng, "An adaptive partitioning scheme for DRAM-based cache in Solid State Drives," 2010 IEEE 26th Symposium on Mass Storage Systems and Technologies (MSST), 2010, pp. 1-12. (Year: 2010).*

Perarnau et al. "Discovering Cache Partitioning Optimizations for the K Computer."

Rao. "Caching Techniques to Improve Disk IO Performance in Virtualized Systems." (2016).

Byan et al. "Mercury: Host-side flash caching for the data center." In 012 IEEE 28th Symposium on Mass Storage Systems and Technologies (MSST), pp. 1-12. IEEE, 2012.

Sen et al. "Reuse-based online models for caches." In ACM SIGMETRICS Performance Evaluation Review, vol. 41, No. 1, pp. 279-292. ACM, 2013.

* cited by examiner

CACHE ALLOCATION TO A VIRTUAL MACHINE

CROSS-REFERENCE TO RELATED APPLICATION

This application claims the benefit of priority from U.S. Provisional Patent Application Ser. No. 62/619,179, filed on Jan. 19, 2018, and entitled "HIGH-ENDURANCE AND COST-EFFICIENT I/O CACHING SCHEME FOR VIRTUALIZED PLATFORMS," which is incorporated herein by reference in its entirety.

TECHNICAL FIELD

The present disclosure generally relates to storage systems, and particularly, to caching in virtualized platforms.

BACKGROUND

Virtualization is widely used in data centers and cloud computing in order to improve utilization of high-performance servers. Integrating various virtual machines (VMs) that run with different operating systems on a server may provide more flexibility and higher resource utilization while delivering a desired performance for each VM. In addition, virtualization may provide system isolation where each VM may only have access to its own resources. In a virtualized platform, resource allocation of each VM may be managed by a hypervisor. By employing various modules such as a VM scheduler and a memory and network manager, the hypervisor may orchestrate sharing of resources among VMs according to their demand, in order to improve an overall performance provided by the server.

With increasing performance requirements of data-intensive applications in data centers, storage subsystems have become performance bottlenecks of computing systems. Hard disk drives (HDDs), which may be used as main media for data storage in storage systems, may provide large capacity and low cost, but they may suffer from low performance, particularly for random access workloads. The low performance of HDD-based storage systems may be avoided by employing high-performance storage devices such as solid-state drives (SSDs). Compared to HDDs, SSDs provide higher performance due to their non-mechanical structure used to retrieve and store data. SSDs, however, may cost higher and may support a limited number of reliable writes. Therefore, replacing all HDDs with SSDs may be prohibitively expensive. In order to take advantage of the merits of both HDDs and SSDs, high-performance SSDs may be employed as a caching layer for high-capacity HDDs in storage systems. However, applying such input/output (I/O) caching on virtualization platforms may require a proper cache management scheme in order to achieve higher I/O performance.

There is, therefore, a need for a cache management scheme that provides an efficient cache space for each VM. There is also a need for a cache management scheme that improves performance and endurance of the cache.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for cache allocation to a plurality of virtual machines. An exemplary method may include sequentially receiving a sequence of requests, detecting a plurality of access sequences to a plurality of data elements, calculating a first reuse distance of a plurality of reuse distances by calculating a number of distinctive data elements of the plurality of data elements, estimating an optimal cache size based on the plurality of reuse distances, and assigning the optimal cache size to a virtual machine of a plurality of virtual machines. Each request of the sequence of requests may be associated with an access of a plurality of accesses to the data element, and the plurality of accesses may include a plurality of read accesses and a plurality of write accesses. Each of the plurality of access sequences may include two successive accesses to a single data element of the plurality of data elements, and the two successive accesses may include a first access and a second access. The first access may be associated with a first request of the sequence of requests and the second access may be associated with a second request of the sequence of requests. The second request may be received after the first request, and may be associated with a read access of the plurality of read accesses to the single data element. Each of the distinctive data elements may be associated with one or more of a plurality of requests, and each of the plurality of requests may be located between the first request and the second request in the sequence of requests.

In an exemplary embodiment, assigning the optimal cache size to the virtual machine may include estimating an efficient cache size by minimizing an objective function with respect to a cache size subject to a set of minimization constraints. In an exemplary embodiment, minimizing the objective function may include approximating a global optimum of the objective function by a simulated annealing technique.

In an exemplary embodiment, an exemplary method may further include determining a writing policy for the virtual machine based on the number of the plurality of access sequences. In an exemplary embodiment, determining the writing policy may include calculating the number of the plurality of access sequences, calculating a writing ratio for the virtual machine, setting the writing policy to a write-back policy responsive to the writing ratio smaller than a writing threshold, and setting the writing policy to a read-only policy responsive to the writing ratio equal to or larger than the writing threshold. In an exemplary embodiment, determining the writing policy may further include setting the writing threshold to 0.5.

In an exemplary embodiment, the present disclosure describes an exemplary system for cache allocation to a plurality of virtual machines. The system may include a plurality of virtual machines, a storage subsystem, and a hypervisor. The storage subsystem may include a plurality of data elements. The hypervisor may be associated with the plurality of virtual machines. In an exemplary embodiment, the hypervisor may include a monitor, an analyzer, and an actuator.

In an exemplary embodiment, the monitor may be configured to sequentially receive a sequence of requests, and detect a plurality of access sequences to a plurality of data elements. Each request of the sequence of requests may be associated with an access of a plurality of accesses to a data element of the plurality of data elements, and the plurality of accesses may include a plurality of read accesses and a plurality of write accesses. Each of the plurality of access sequences may include two successive accesses to a single data element of the plurality of data elements, and the two successive accesses may include a first access and a second access. The first access may be associated with a first request of the sequence of requests and the second access may be associated with a second request of the sequence of requests. The second request may be received after the first request, and may be associated with a read access of the plurality of read accesses to the single data element.

In an exemplary embodiment, the analyzer may be configured to calculate a reuse distance of a plurality of reuse distances by calculating a number of distinctive data elements of the plurality of data elements, and estimate an optimal cache size based on the plurality of reuse distances. Each of the distinctive data elements may be associated with one or more of a plurality of requests, and each of the plurality of requests may be located between the first request and the second request in the sequence of requests. In an exemplary embodiment, the actuator may be configured to assign the optimal cache size to a virtual machine of the plurality of virtual machines.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
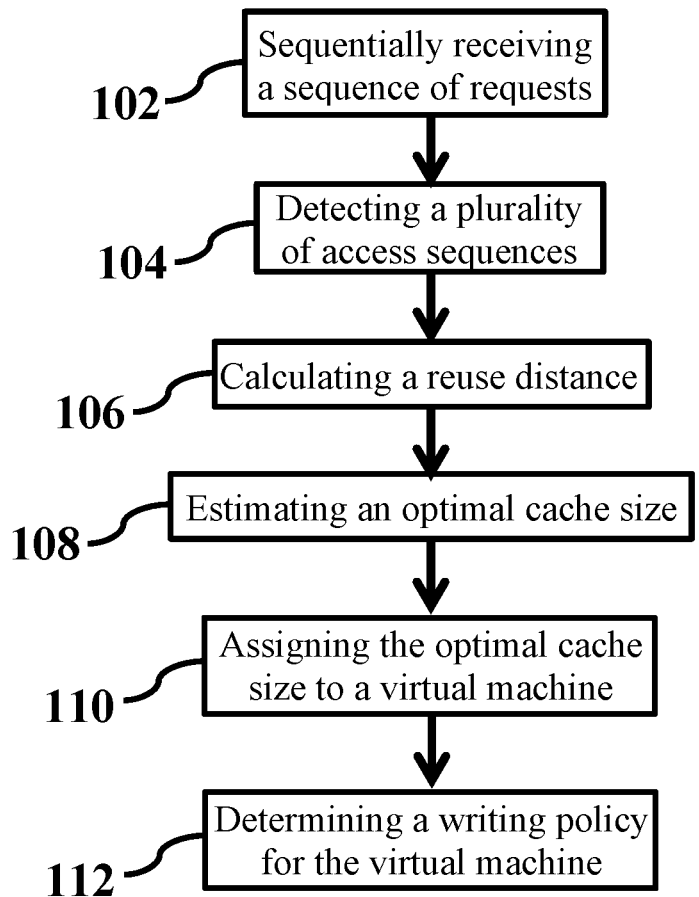
FIG. 1A shows a flowchart of a method for cache allocation to a plurality of virtual machines, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for cache allocation for virtual machines (VMs) in a virtualization platform. The method aims to improve both the performance and endurance of the cache by obtaining an efficient cache size and an effective write policy for each VM. For this purpose, a reuse distance is defined for each data element of the cache to be used as a metric for estimating an optimal cache size for each VM. For each data element, a reuse distance may be calculated by calculating the number of distinctive data elements between two successive requests to the respective data element, in which the later request may include a read access to the data element. In an exemplary embodiment, a data element may refer to a unit of data defined for processing. In an exemplary embodiment, a data element may be defined by one or more of a size, a type, and an address. Among the calculated reuse distances, the largest one may be used for an optimal cache size estimation. Cache size estimation based on the request type and without considering unnecessary writes accesses (i.e., writes without any further read access) may lead to obtaining a reduced cache space.

In a scenario that the total cache size is limited, an exemplary method may dynamically partition the cache across the VMs. For this purpose, a response time (i.e., latency) may be defined for each VM as a function of the cache size and may be minimized respective to the cache size to find an efficient cache size for each VM. The estimated optimal cache size may be used as an upper limit for the efficient cache size to increase the hit ratio as much as allowed by the limited cache size. A write policy may also be assigned to each VM based on the majority of request types (i.e., read or write requests) to improve the endurance of the cache while minimizing negative impact on its performance, such as decreasing the hit ratio of the cache. If the majority of requests of a VM are read requests, a read-only policy may be assigned to the VM to minimize write accesses to the cache and improve its lifetime.

FIG. 1A shows a flowchart of a method for cache allocation to a plurality of virtual machines, consistent with one or more exemplary embodiments of the present disclosure. An exemplary method 100 may include sequentially receiving a sequence of requests (step 102), detecting a plurality of access sequences to a plurality of data elements (step 104), calculating a first reuse distance of a plurality of reuse distances by calculating a number of distinctive data elements of the plurality of data elements (step 106), estimating an optimal cache size based on the plurality of reuse distances (step 108), and assigning the optimal cache size to a virtual machine of a plurality of virtual machines (step 110). In an exemplary embodiment, each request of the sequence of requests may be associated with an access of a plurality of accesses to the data element, and the plurality of accesses may include a plurality of read accesses and a plurality of write accesses. In an exemplary embodiment, each of the plurality of access sequences may include two successive accesses to a single data element of the plurality of data elements and the two successive accesses may include a first access and a second access. The first access may be associated with a first request of the sequence of requests and the second access may be associated with a second request of the sequence of requests. In an exemplary embodiment, the second request may be received after the first request and may be associated with a read access of the plurality of read accesses to the single data element. In an exemplary embodiment, each of the distinctive data elements may be associated with one or more of a plurality of requests, and each of the plurality of requests may be located between the first request and the second request in the sequence of requests.

Figure 2:
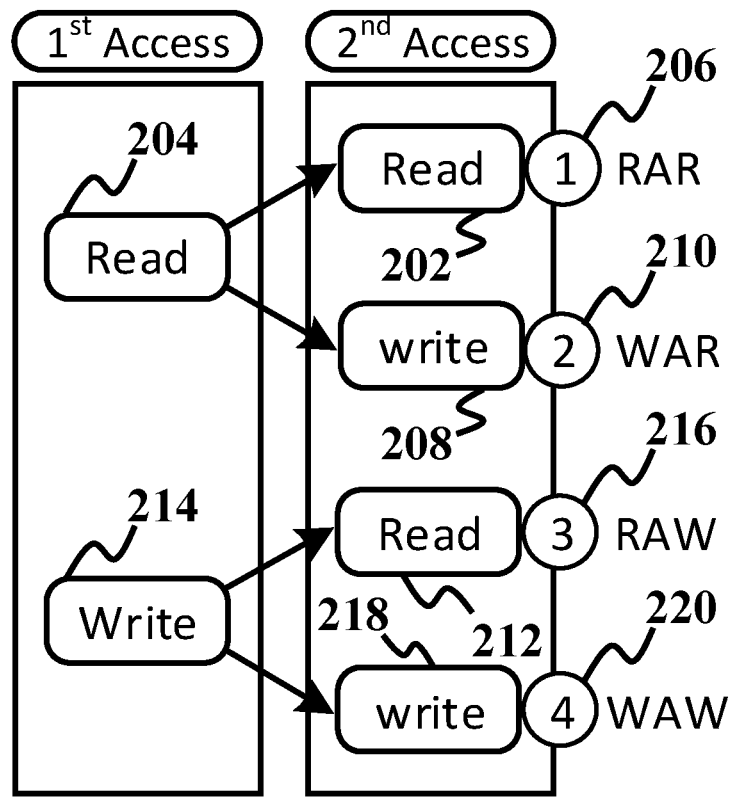
FIG. 2 shows different types of access sequences, consistent with one or more exemplary embodiments of the present disclosure.

For further detail with regards to method 100, FIG. 2 shows different types of access sequences, consistent with one or more exemplary embodiments of the present disclosure. In an exemplary embodiment, an access sequence may be classified in four groups based on its type, including a read after read (RAR) sequence 206, a write after read (WAR) sequence 210, a read after write (RAW) sequence 216, and a write after write (WAW) sequence 220. In an exemplary embodiment, RAR sequence 206 may include a read access 202 after a read access 204. In an exemplary embodiment, WAR sequence 210 may include a write access 208 after read access 204 (WAR). In an exemplary embodiment, RAW sequence 216 may include a read access 212 after a write access 214. In an exemplary embodiment, WAW sequence 220 may include a write access 218 after write access 214.

In an exemplary embodiment, data caching for read accesses may include reading data from a cache disk if the data already exists in the cache disk. In this case, a cache hit may be detected. Otherwise, i.e., if a cache miss is detected, the data may be read from a memory disk and may be stored in the cache for further accesses. In an exemplary embodiment, data caching for write accesses may include writing data directly to the cache, which may result in the modification of previously written data in the cache.

In an exemplary embodiment, in read access 204 of RAR sequence 206, a cache miss may fetch data from a memory disk, for example a hard disk drive (HDD) to the cache. In addition, read access 204 may read the data from the cache. In this case, caching data block of read access 204 may improve a hit ratio (i.e., the ratio of cache hits to the total number of accesses).

In an exemplary embodiment, read access 204 may lead to fetching data from a memory disk to a cache disk in WAR sequence 210. In addition, write access 210 may modify the data in the cache without any read access to the cached data. In this case, caching the data associated with read access 204 may not improve the hit ratio and may cost one write to the cache.

In an exemplary embodiment, write access 214 may write data to the cache in RAW sequence 216. Furthermore, read access 212 may read the data from the cache. In this case, caching the data associated with write access 214 may increase the hit ratio of the cache.

In an exemplary embodiment, write access 214 may write data to the cache in WAW sequence 220. In addition, write access 218 may modify the data without any read access. In this case, caching the data associated with write access 214 may not improve the hit ratio and may cost two writes to the cache.

Based on the above, in an exemplary embodiment, removing WAR and WAW access sequences from a cache size estimation process may have a minor impact on the efficiency of the estimated cache size since considering WAR and WAR sequences may result in an unnecessarily increased cache size that may not increase the hit ratio. Therefore, in an exemplary embodiment, access sequences with a second read access (i.e., RAR and RAW sequences) may be considered for reuse distance calculation, and subsequently, cache size estimation.

Figure 3:
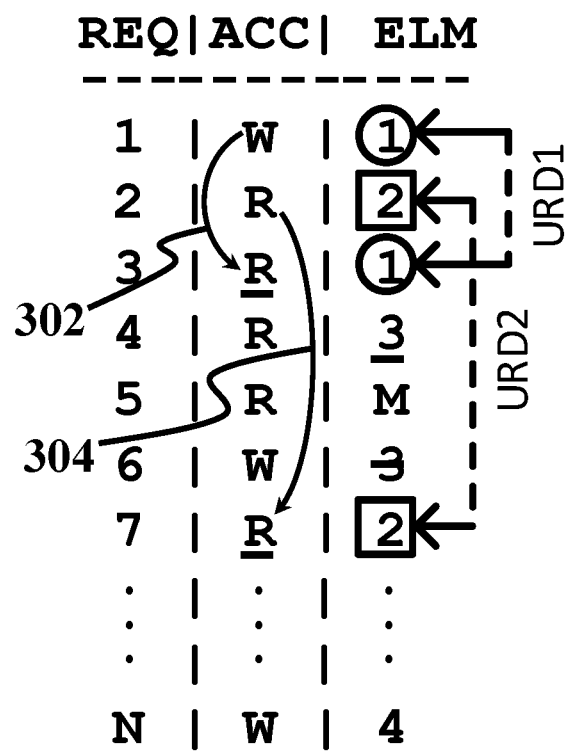
FIG. 3 shows a sequence of requests, consistent with one or more exemplary embodiments of the present disclosure.

For further detail with respect to method 100, FIG. 3 shows a sequence of requests, consistent with one or more exemplary embodiments of the present disclosure. An exemplary sequence of requests REQ may include N requests. In an exemplary embodiment, each request of the sequence of requests REQ may be associated with an access of a plurality of accesses ACC, and each of the plurality of accesses ACC may include a read access R of the plurality of read accesses and a write access W of the plurality of write accesses. In an exemplary embodiment, plurality of accesses ACC may be associated with a plurality of data elements ELM. In an exemplary embodiment, plurality of data elements ELM may include M data elements. In an exemplary embodiment, each request of sequence of requests REQ may have a read access R or a write access W to one of plurality of data elements ELM.

In an exemplary embodiment, each of an exemplary plurality of access sequences may include two successive accesses to a single data element of plurality of data elements ELM. For example, an access sequence 302 may include two successive accesses to a data element 1 (marked by a circle in FIG. 3), and an access sequence 304 may include two successive access to a data element 2 (marked by a square in FIG. 3). For each data element, the two successive accesses may include a first access and a second access. For example, for data element 1, access sequence 202 may include a first write access W followed by a second read access R. For each data element, the first access may be associated with a first request of the sequence of requests and the second access may be associated with a second request of the sequence of requests. For example, for data element 2, a first read access R of access sequence 304 may be associated with a first request 2 of sequence of requests REQ, and a second read access R may be associated with a second request 7 of sequence of requests REQ. In an exemplary embodiment, the second request may be received after the first request and may be associated with a read access R of the plurality of read accesses to the single data element. For example, a second request 3 may be received after a first request 1 in access sequence 302, and second request 7 may be received after first request 2 in access sequence 304. For both access sequences 302 and 304, second requests 3 and 7 are read requests, designated by R in FIG. 3. In other words, no other request of sequence of requests REQ may have a read access R to the single data element between the first request and the second request in sequence of requests REQ.

In an exemplary embodiment, a distinctive data element may be associated with one or more of an exemplary plurality of requests, and each of the exemplary plurality of requests may be located between the first request and the second request in sequence of requests REQ. Therefore, the plurality of requests may correspond to an access sequence. For example, for access sequence 304, a distinctive element 1 of the plurality of data elements ELM may be associated with a request 3 of the exemplary plurality of requests, a distinctive element 3 may be associated with requests 4 and 6 of the exemplary plurality of requests, and a distinctive element M may be associated with a request 5 of the exemplary plurality of requests. In other words, the exemplary plurality of requests, including requests 3-6, located between first request 2 and second request 7 in sequence of requests REQ, may have accesses to distinctive elements 1, 3, and M.

In further detail with respect to step 102, in an exemplary embodiment, the sequence of requests may be received at specific time intervals. At each interval, the sequence of requests may form a different workload. For each request of the workload, information regarding a destination address of the request, the request size, and the request type may be extracted to be used in the cache size estimation.

In further detail with respect to step 104, detecting the plurality of access sequences to plurality of data elements ELM may include detecting separate sets of access sequences to each of plurality of data elements ELM. For example, for data element 1, access sequence 302 may be detected, and for data element 2, access sequence 304 may be detected. In an exemplary embodiment, more than one access sequences may also be detected for a single data element, depending on sequence of requests REQ and plurality of accesses ACC. Therefore, for each of plurality of data elements ELM, there may be one or more sets of distinctive data elements, and each set of distinctive data elements may be associated with a separate access sequence to the respective data element.

In further detail with respect to step 106, calculating a first reuse distance of the plurality of reuse distances, hereinafter also referred to as a useful reuse distance (URD), may include calculating the number of the distinctive data elements of plurality of data elements ELM. For example, for data element 1, there is one distinctive data element (data element 2) associated with access sequence 302. Therefore, for data element 1, a reuse distance URD1=1 may be obtained as the first reuse distance. As another example, for data element 2, there are three distinctive data elements associated with access sequence 304. The three distinctive data elements include data element 1 (associated with request 3), data element 3 (associated with requests 4 and 6), and data element M (associated with request 5). Since data element 3 is associated with more than one request of sequence of requests REQ, only one incident of data element 3 in plurality of data elements ELM may be considered as a distinctive data element in the calculation of the number of the distinctive data elements. For example, an incident of data element 3 associated with request 4 (shown as 3 in FIG. 3) may be considered for calculation, and another incident of data element 3 associated with request 6 (shown as 3 in FIG. 3) may be ignored. Therefore, for data element 2, a reuse distance URD2=3 may be obtained as the first reuse distance.

In further detail with respect to step 108, estimating the optimal cache size may include estimating a cache size $c_i$ according to an operation defined by the following:

$$c_i = (URD_{max} + 1) \times BLK, \quad \text{Equation (1)}$$

where $URD_{max}$ is a largest of the plurality of reuse distances and BLK is a size of a cache block associated with the data element.

In further detail with respect to step 110, assigning the optimal cache size to the virtual machine may include estimating an efficient cache size by minimizing an objective function $OF(c_i)$ with respect to cache size $c_i$ subject to a set of minimization constraints. In an exemplary embodiment, minimizing the objective function may include approximating a global optimum of the objective function by a simulated annealing technique. In an exemplary embodiment, a total cache space may have to be greater than or equal to the sum of the cache sizes of all of the plurality of virtual machines. Hence, there may be two cases for the allocated cache size: (1) the sum of estimated cache sizes for all of the plurality of virtual machines using Equation (1) is less than the total cache space, and (2) the sum of estimated cache sizes is greater than the total cache space. In the first scenario (i.e., when the cache space is not limited), Equation (1) may determine the estimated cache space for each of the plurality of virtual machines, i.e., the efficient cache size may be equal to the optimal cache size. In the second scenario (i.e., when the cache space is limited), due to a shortage of the cache space, the efficient cache size may be calculated for each of the plurality of virtual machines by minimizing the objective function in order to fit each of the plurality of virtual machines into the existing cache space.

In an exemplary embodiment, objective function $OF(c_i)$ may be defined according to an operation defined by the following:

$$OF(c_i) = \Sigma_{i=1}^{N} \text{latency}(VM_i), \quad \text{Equation (2)}$$

where:

N is the number of the plurality of virtual machines, $VM_i$ is an $i^{th}$ virtual machine of the plurality of virtual machines where i is an integer number in a range of 1 and N, and function latency($VM_i$) may be defined according to an operation defined by the following:

$$\text{latency}(VM_i) = H_i(c_i) \times T_{ssd} + (1 - H_i(c_i)) \times T_{hdd}, \quad \text{Equation (3)}$$

where:

$H_i(c_i)$ is a hit ratio of the $i^{th}$ virtual machine at cache size $c_i$, $T_{ssd}$ is a latency of a cache disk, such as a solid-state drive (SSD), and $T_{hdd}$ is a latency of a computer disk, such as a hard-disk drive (HDD).

In an exemplary embodiment, the set of minimization constraints may include a first constraint and a second constraint. The first constraint may be defined according to $\Sigma_{i=1}^{N} c_i \leq C$, where C is a total cache size. The second constraint may be defined according to $c_i \leq C_{URD}$, where $C_{URD}$ is the optimal cache size assigned to the $i^{th}$ virtual machine. In an exemplary embodiment, $C_{URD}$ may be estimated for each of the plurality of virtual machines by an implementation of Equation (1).

In further detail with respect to Equations (2) and (3), minimizing objective function $OF(c_i)$ may include obtaining hit ratio $H_i(c_i)$ by assigning a value $h_i = f_k/K$ to a hit ratio function $H_i(c)$ responsive to a cache size variable c being in a range of $m_k$ and $m_{k+1}$, where:

$m_k$ is a $k^{th}$ reuse distance value of a plurality of reuse distance values, where the plurality of reuse distance values include distinctive values of the plurality of reuse distances sorted in an ascending order, $f_k$ is a size of a reuse distance subset, where the reuse distance subset includes a second reuse distance, where the second reuse distance is equal to or smaller than $m_k$, and K is the number of the plurality of reuse distances.

For further clarification of obtaining the hit ratio, Table 1 shows an example of $H_i(c)$ calculation for a total number of 24 URDs. In Table 1, values of $m_k$ are sorted in the ascending order, and each $m_k$ shows an exemplary distinctive value of the URD. The frequency column shows the frequency of each value of $m_k$ in the plurality of reuse distances. Therefore, sum of the frequency values gives total number K of the plurality of reuse distances. For each $m_k$, a separate reuse distance subset may be obtained with a size $f_k$. Each of the subsets includes URDs with values equal to or smaller than the corresponding $m_k$. Therefore, for each k, $f_k$ equals to the sum of frequencies of $m_1$ to $m_k$. As a result, $f_k$ may always increase with k. Hence, hit ratio $H_i(c)$ also increases when c reaches a new $m_k$, and for k=K, $H_i(c)$ equals to 1.

TABLE 1

An example of $H_i(c)$ calculation

| k | $m_k$ | Frequency | $f_k$ | $H_i(c)$ for $m_k \leq c < m_{k+1}$ |
|---|---|---|---|---|
| 1 | 1 | 1 | 1 | 1/24 |
| 2 | 3 | 4 | 5 | 5/24 |
| 3 | 5 | 6 | 11 | 11/24 |
| 4 | 7 | 1 | 12 | 12/24 |
| 5 | 9 | 12 | 24 | 24/24 = 1 |

In an exemplary embodiment, Equation (2) may be utilized to provide a minimum latency for all of the plurality of virtual machines. As a result, a cache space may be partitioned in a way that may minimize an aggregate latency of all of the plurality of virtual machines.

Figure 1B:
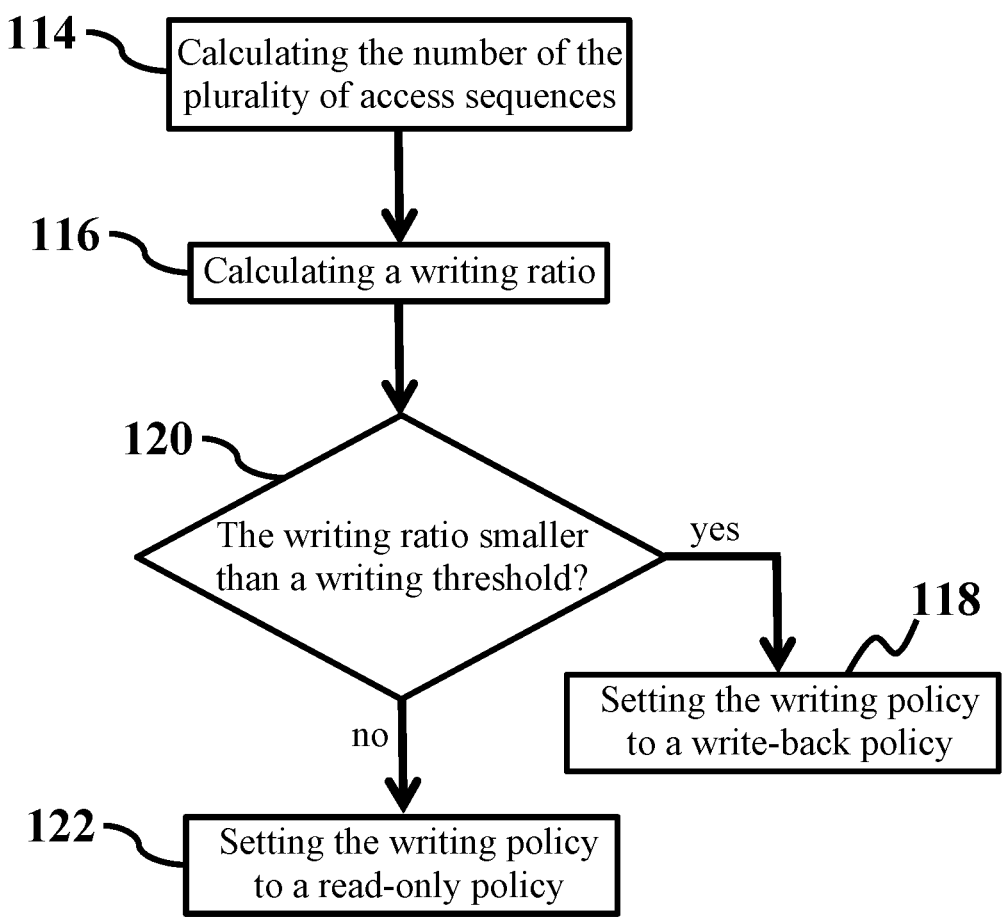
FIG. 1B shows a flowchart of determining a writing policy for a virtual machine, consistent with one or more exemplary embodiments of the present disclosure.

Referring again to FIG. 1A, in an exemplary embodiment, method 100 may further include determining a writing policy for the virtual machine based on the number of the plurality of access sequences (step 112). FIG. 1B shows a flowchart of determining a writing policy for the virtual machine, consistent with one or more exemplary embodiments of the present disclosure. In an exemplary embodiment, determining the writing policy (step 112) may include calculating the number of the plurality of access sequences (step 114), calculating a writing ratio for the virtual machine (VM) (step 116), setting the writing policy to a write-back (WB) policy (step 118) responsive to the writing ratio smaller than a writing threshold (step 120, yes), and setting the writing policy to a read-only (RO) policy (step 122) responsive to the writing ratio equal to or larger than the writing threshold (step 120, no). In an exemplary embodiment, determining the writing policy may further include setting the writing threshold to 0.5. As a result, the writing policy may be set to RO when the majority of accesses are write accesses. Therefore, unnecessarily caching write accesses without a further read access may be prevented, which may also enhance the endurance of the cache.

In further detail with respect to step 116, the writing ratio may be calculated according to an operation defined by the following:

$$WR = \frac{N_R - N_A}{N_R}, \quad \text{Equation (4)}$$

where WR is the writing ratio, $N_A$ is the number of the plurality of access sequences, and $N_R$ is the length of the sequence of requests.

In further detail with respect to step 112, the goal of defining the writing threshold may be to use the RO policy for VMs with unnecessary writes (i.e., write operations without any further read access) and the WB policy for VMs with referenced write operations (i.e., write operations with further read access). In an exemplary embodiment, to diminish the number of unnecessary writes, RO policy may be assigned to cache disks of VMs with read-intensive access patterns (including RAR and RAW accesses). In an exemplary embodiment, RO policy may improve the performance of read operations and may increase lifetimes of SSDs. In addition, such a scheme may be more reliable since it does not buffer writes on cache disks.

In an exemplary embodiment, if the writing ratio of a running workload exceeds a defined threshold, the write policy may be changed to RO, to prevent keeping such a large number of written blocks in a cache. This is due to two reasons. First, such a workload may include a large amount of writes, and holding such writes in a cache may likely not have a positive impact on the hit ratio. Second, caching such a large amount of writes may have a negative impact on the endurance of SSDs. Therefore, in an exemplary embodiment, the WB cache policy may be selected when the running workload on a VM includes large percentage of RAW accesses. In addition, the RO policy may be assigned to caches with a larger percentage of WAW and WAR accesses. In an exemplary embodiment, the behavior of running workloads may be analyzed periodically, and the write policy may be updated by recalculating the writing ratio according to Equation (4).

Figure 4:
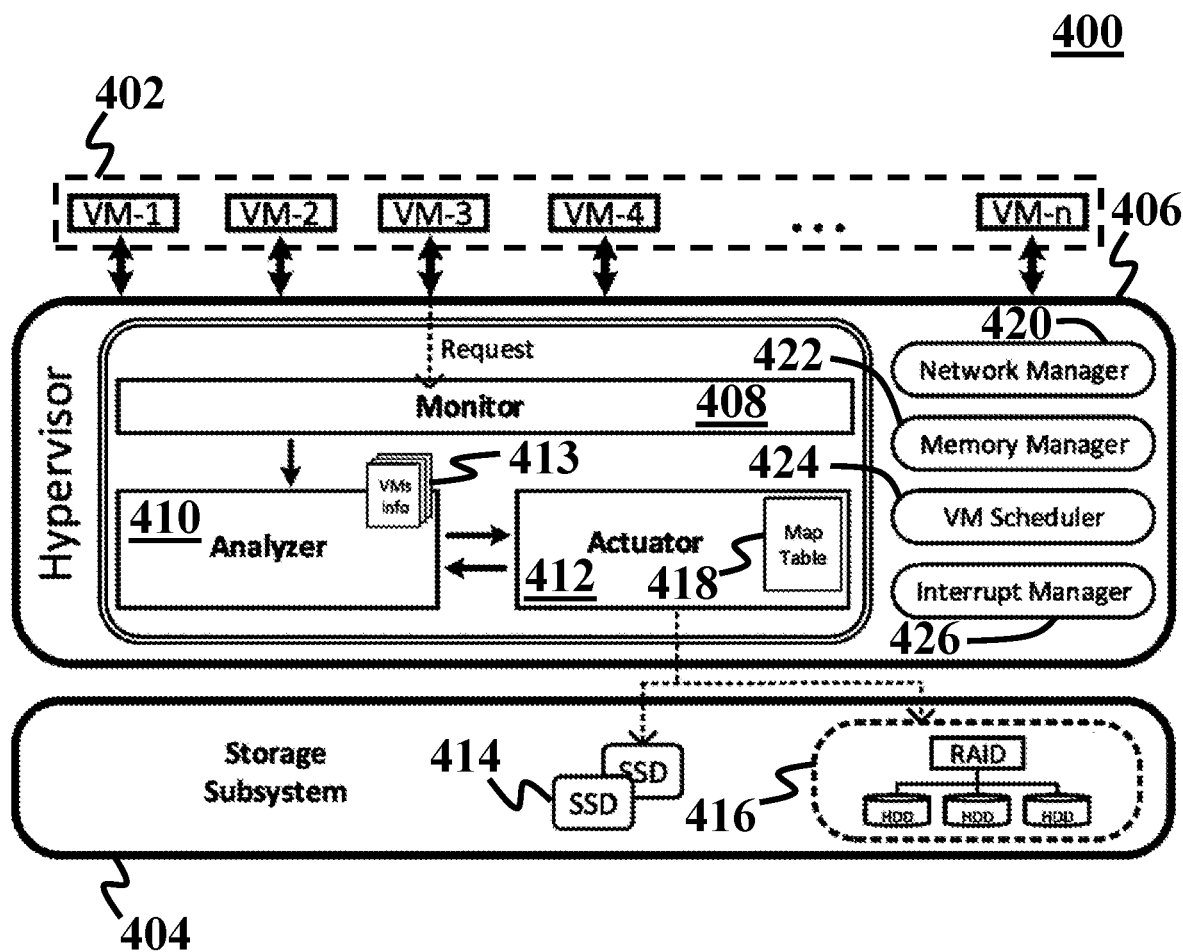
FIG. 4 shows a schematic of a system for cache allocation to a plurality of virtual machines, consistent with one or more exemplary embodiments of the present disclosure.

FIG. 4 shows a schematic of a system for cache allocation to a plurality of virtual machines, consistent with one or more exemplary embodiments of the present disclosure. In an exemplary embodiment, different steps of method 100 may be implemented by utilizing an exemplary system 400. In an exemplary embodiment, system 400 may include a plurality of virtual machines (VMs) 402, a storage subsystem 404, and a hypervisor 406. In an exemplary embodiment, storage subsystem 404 may include a plurality of data elements. In an exemplary embodiment, hypervisor 406 may be associated with plurality of VMs 402. In an exemplary embodiment, plurality of VMs 402 may include several VMs running various workloads with different input/output (IO) behavior, and hypervisor 406 may be responsible for partitioning a cache space efficiently among plurality of VMs 402. In an exemplary embodiment, hypervisor 406 may orchestrate a sharing of resources among plurality of VMs 402 according to their demand by employing various modules, including one or more of a network manager 420, a memory manager 422, a VM scheduler 424, and an interrupt manager 426. In an exemplary embodiment, hypervisor 406 may include a monitor 408, an analyzer 410, and an actuator 412.

In an exemplary embodiment, monitor 408 may be configured to sequentially receive a sequence of requests, and detect a plurality of access sequences to a plurality of data elements. In an exemplary embodiment, monitor 408 may allow for receiving all IO requests coming from plurality of VMs 402 and extracting important information such as VM identification number (VM-ID), request type (read or write), destination address, and request size. Each request of the sequence of requests may be associated with an access of a plurality of accesses to a data element of the plurality of data elements, and the plurality of accesses may include a plurality of read accesses and a plurality of write accesses. Each of the plurality of access sequences may include two successive accesses to a single data element of the plurality of data elements, and the two successive accesses may include a first access and a second access. The first access may be associated with a first request of the sequence of requests and the second access may be associated with a second request of the sequence of requests. The second request may be received after the first request, and may be associated with a read access of the plurality of read accesses to the single data element.

In an exemplary embodiment, analyzer 410 may be configured to calculate a first reuse distance of a plurality of reuse distances by calculating a number of distinctive data elements of the plurality of data elements and estimate an optimal cache size based on the plurality of reuse distances. Each of the distinctive data elements may be associated with one or more of a plurality of requests, and each of the plurality of requests may be located between the first request and the second request in the sequence of requests. In an exemplary embodiment, analyzer 410 may decide a target destination of a given IO request, an efficient cache size for each of plurality of VMs 402, and a write policy of the I/O cache for each of plurality of VMs 402, based on the information received from monitor 408 and a given database 413 of VMs information. In an exemplary embodiment, analyzer 410 may keep information about each of plurality of VMs 402, such as the cache size, the write policy, workload characteristics, and the number of plurality of VMs 402 running in system 400.

In an exemplary embodiment, actuator 412 may allow for assigning the optimal cache size to a virtual machine of plurality of VMs 402. In an exemplary embodiment, actuator 412 may be responsible for realizing the decisions made by analyzer 410. In an exemplary embodiment, actuator 412 may allocate an estimated cache space for each of plurality of VMs 402, configure a decided write policy, and route the IO requests to a cache disk 416, for example, a solid-state drive (SSD), or a computer disk 416, for example, a hard-disk drive (HDD) 416. In an exemplary embodiment, actuator 412 may keep logs for blocks stored in either cache disk 416 or computer disk 416, which may be used for responding to future requests in a table 418 (also called a map table).

Figure 5:
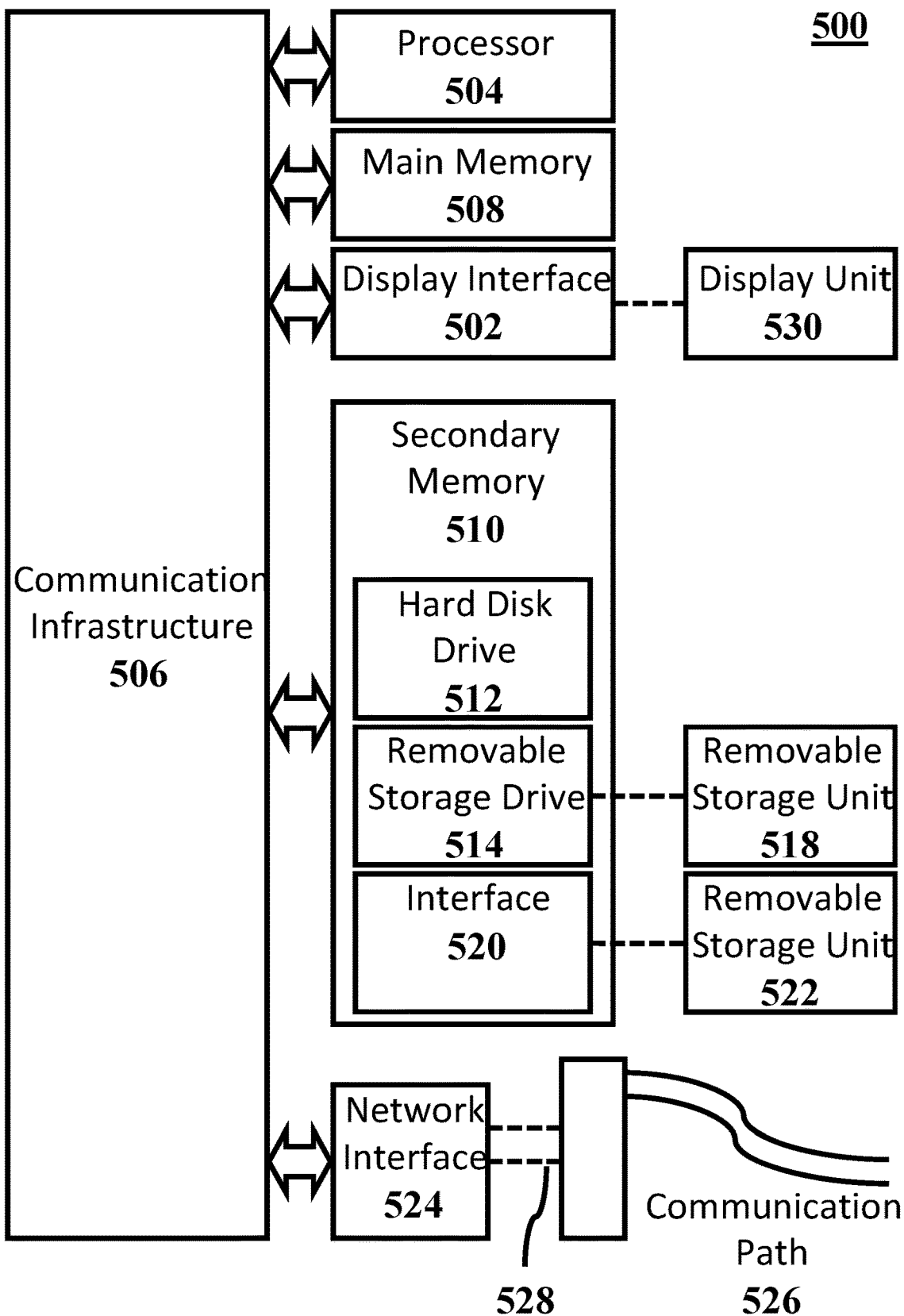
FIG. 5 shows a high-level functional block diagram of a computer system, consistent with one or more exemplary embodiments of the present disclosure.

FIG. 5 shows an example computer system 500 in which an embodiment of the present invention, or portions thereof, may be implemented as computer-readable code, consistent with exemplary embodiments of the present disclosure. For example, method 100 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-4.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 100 of FIG. 1A and flowchart 112 of FIG. 1B discussed above. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for cache allocation to a plurality of virtual machines, the method comprising:
sequentially receiving a sequence of requests, each request of the sequence of requests associated with an access of a plurality of accesses to a data element of a plurality of data elements, the plurality of accesses comprising a plurality of read accesses and a plurality of write accesses;

detecting a plurality of access sequences to the plurality of data elements by detecting each of the plurality of access sequences through detecting two successive accesses to a single data element of the plurality of data elements;

calculating a first reuse distance of a plurality of reuse distances by calculating a number of distinctive data elements of the plurality of data elements, each of the distinctive data elements associated with one or more of a plurality of requests, the plurality of requests associated with the two successive accesses;

estimating an optimal cache size by estimating a cache size $c_i$ according to an operation defined by the following:

$$c_i = (URD_{max} + 1) \times BLK$$

where $URD_{max}$ is a largest reuse distance of the plurality of reuse distances and BLK is a size of a cache block associated with the data element; and assigning the optimal cache size to a virtual machine of a plurality of virtual machines.

2. The method of claim 1, wherein detecting the two successive accesses comprises detecting a first access and a second access, the first access associated with a first request of the sequence of requests and the second access associated with a second request of the sequence of requests, the second request received after the first request, the second request associated with a read access of the plurality of read accesses to the single data element, and wherein each of the plurality of requests is located between the first request and the second request in the sequence of requests.

3. The method of claim 1, wherein assigning the optimal cache size to the virtual machine comprises estimating an efficient cache size by minimizing an objective function $OF(c_i)$ with respect to the cache size $c_i$ subject to a set of minimization constraints, wherein:

the objective function is defined according to an operation defined by the following:

$$OF(c_i) = \sum_{i=1}^{N} \text{latency}(VM_i),$$

where:
N is the number of the plurality of virtual machines, $VM_i$ is an $i^{th}$ virtual machine of the plurality of virtual machines where i is an integer number in a range of 1 and N, and $$\text{latency}(VM_i) = H_i(c_i) \times T_{ssd} + (1 - H_i(c_i)) \times T_{hdd},$$

where:
$H_i(c_i)$ is a hit ratio of the $i^{th}$ virtual machine at the cache size $C_i$,
$T_{ssd}$ is a latency of a cache disk, and
$T_{hdd}$ is a latency of a computer disk; and the set of minimization constraints comprises:
a first constraint defined according to the following:
$\sum_{i=1}^{N} c_i \leq C$, where C is a total cache size; and
a second constraint defined according to the following:
$c_i \leq C_{URD}$, where $C_{URD}$ is the optimal cache size assigned to the $i^{th}$ virtual machine.

4. The method of claim 3, wherein minimizing the objective function comprises approximating a global optimum of the objective function by a simulated annealing technique.

5. The method of claim 3, wherein minimizing the objective function comprises assigning a value $h_i = f_k/K$ to a hit ratio function $H_i(c)$ responsive to a cache size variable c being in a range of $m_k$ and $m_{k+1}$, where:

$m_k$ is a $k^{th}$ reuse distance value of a plurality of reuse distance values, the plurality of reuse distance values comprising distinctive values of the plurality of reuse distances sorted in an ascending order, $f_k$ is a size of a reuse distance subset, the reuse distance subset comprising a second reuse distance, the second reuse distance equal to or smaller than $m_k$, and K is the number of the plurality of reuse distances.

6. The method of claim 1, further comprising determining a writing policy for the virtual machine based on the number of the plurality of access sequences.

7. The method of claim 6, wherein determining the writing policy comprises:

calculating the number of the plurality of access sequences $N_A$;

calculating a writing ratio WR for the virtual machine according to an operation defined by the following:

$$WR = \frac{N_R - N_A}{N_R},$$

where $N_R$ is the length of the sequence of requests;

setting the writing policy to a write-back policy responsive to the writing ratio smaller than a writing threshold; and setting the writing policy to a read-only policy responsive to the writing ratio equal to or larger than the writing threshold.

8. The method of claim 7, determining the writing policy further comprises setting the writing threshold to 0.5.

9. A system for cache allocation to a plurality of virtual machines, the system comprising:

a memory having processor-readable instructions stored therein; and one or more processors configured to access the memory and execute the processor-readable instructions, which, when executed by the one or more processors configures the one or more processors to perform a method, the method comprising:

sequentially receiving a sequence of requests, each request of the sequence of requests associated with an access of a plurality of accesses to a data element of a plurality of data elements, the plurality of accesses comprising a plurality of read accesses and a plurality of write accesses;

detecting a plurality of access sequences to the plurality of data elements, each of the plurality of access sequences comprising two successive accesses to a single data element of the plurality of data elements, the two successive accesses comprising a first access and a second access, the first access associated with a first request of the sequence of requests and the second access associated with a second request of the sequence of requests, the second request received after the first request, the second request associated with a read access of the plurality of read accesses to the single data element;

calculating a reuse distance of a plurality of reuse distances by calculating a number of distinctive data elements of the plurality of data elements, each of the distinctive data elements associated with one or more of a plurality of request, each of the plurality of requests located between the first request and the second request in the sequence of requests;

estimating an optimal cache size $c_i$ according to an operation defined by the following:

$$c_i = (URD_{max}+1) \times BLK,$$

where $URD_{max}$ is a largest of the plurality of reuse distances and BLK is a size of a cache block associated with the data element; and estimating an efficient cache size by minimizing an objective function $OF(c_i)$ with respect to the cache size $c_i$ subject to a set of minimization constraints;

assigning the efficient cache size to a virtual machine of a plurality of virtual machines; and determining a writing policy for the virtual machine based on the number of the plurality of access sequences.

10. The system of claim 9, wherein the objective function is defined according to an operation defined by the following:

$$OF(c_i) = \sum_{i=1}^{N} \text{latency}(VM_i),$$

where:
N is the number of the plurality of virtual machines,
$VM_i$ is an $i^{th}$ virtual machine of the plurality of virtual machines where i is an integer number in a range of 1 and N, and $$\text{latency}(VM_i) = H_i(c_i) \times T_{ssd} + (1 - H_i(c_i)) \times T_{hdd},$$

where:
$H_i(c_i)$ is a value of a hit ratio function $H_i(c)$ of the $i^{th}$ virtual machine at the cache size $c_i$, wherein a value $h_i = f_k/K$ is assigned to the hit ratio function $H_i(c)$ responsive to a cache size variable c being in a range of $m_k$ and $m_{k+1}$, where:
$m_k$ is a $k^{th}$ reuse distance value of a plurality of reuse distance values, the plurality of reuse distance values comprising distinctive values of the plurality of reuse distances sorted in an ascending order,
$f_k$ is a size of a reuse distance subset, the reuse distance subset comprising a second reuse distance, the second reuse distance equal to or smaller than $m_k$, and
K is the number of the plurality of reuse distances;
$T_{ssd}$ is a latency of a cache disk, and
$T_{hdd}$ is a latency of a computer disk.

11. The system of claim 9, wherein the set of minimization constraints comprises:
a first constraint defined according to the following:
$\sum_{i=1}^{N} c_i \leq C$, where C is a total cache size; and
a second constraint defined according to the following:
$c_i \leq C_{URD}$, where $C_{URD}$ is the optimal cache size assigned to the $i^{th}$ virtual machine.

12. The system of claim 9, wherein determining the writing policy comprises:
calculating the number of the plurality of access sequences $N_A$;

calculating a writing ratio WR for the virtual machine according to an operation defined by the following:

$$WR = \frac{N_R - N_A}{N_R},$$

where $N_R$ is the length of the sequence of requests;
setting the writing policy to a write-back policy responsive to the write ratio smaller than a writing threshold; and
setting the writing policy to a read-only policy responsive to the write ratio equal to or larger than the writing threshold.

13. A system for cache allocation, comprising:
a plurality of virtual machines;
a storage subsystem comprising a plurality of data elements;
a memory having processor-readable instructions stored therein; and
one or more processors configured to access the memory and execute the processor-readable instructions, which, when executed by the one or more processors configures the one or more processors to perform a method, the method comprising:
sequentially receiving a sequence of requests, each request of the sequence of requests associated with an access of a plurality of accesses to a data element of the plurality of data elements, the plurality of accesses comprising a plurality of read accesses and a plurality of write accesses;
detecting a plurality of access sequences to the plurality of data elements by detecting each of the plurality of access sequences through detecting two successive accesses to a single data element of the plurality of data elements;
calculating a reuse distance of a plurality of reuse distances by calculating a number of distinctive data elements of the plurality of data elements, each of the distinctive data elements associated with one or more of a plurality of requests, the plurality of requests associated with the two successive accesses;
estimating an optimal cache size by estimating a cache size $c_i$ according to an operation defined by the following:

$$c_i = (URD_{max}+1) \times BLK$$

where $URD_{max}$ is a largest reuse distance of the plurality of reuse distances and BLK is a size of a cache block associated with the data element; and
assigning the optimal cache size to a virtual machine of the plurality of virtual machines.

14. The system of claim 13, wherein
detecting the two successive accesses comprises detecting a first access and a second access, the first access associated with a first request of the sequence of requests and the second access associated with a second request of the sequence of requests, the second request received after the first request, the second request associated with a read access of the plurality of read accesses to the single data element, and
wherein each of the plurality of requests is located between the first request and the second request in the sequence of requests.

15. The system of claim 13, wherein assigning the optimal cache size to the virtual machine comprises estimating an efficient cache size by minimizing an objective function OF($c_i$) with respect to the cache size $c_i$ subject to a set of minimization constraints, wherein:

the objective function is defined according to an operation defined by the following:

$$OF(c_i) = \sum_{i=1}^{N} \text{latency}(VM_i),$$

where:
N is the number of the plurality of virtual machines,
$VM_i$ is an $i^{th}$ virtual machine of the plurality of virtual machines where i is an integer number in a range of 1 and N, and $$\text{latency}(VM_i) = H_i(c_i) \times T_{ssd} + (1 - H_i(c_i)) \times T_{hdd},$$

where:
$H_i(c_i)$ is a hit ratio of the $i^{th}$ virtual machine at the cache size $c_i$,
$T_{ssd}$ is a latency of a cache disk, and
$T_{hdd}$ is a latency of a computer disk; and the set of minimization constraints comprises:
a first constraint defined according to the following:
$\Sigma_{i=1}^{N} c_i \leq C$, where C is a total cache size; and
a second constraint defined according to the following:
$c_i \leq C_{URD}$, where $C_{URD}$ is the optimal cache size assigned to the $i^{th}$ virtual machine.

16. The system of claim 15, wherein minimizing the objective function comprises approximating a global optimum of the objective function by a simulated annealing technique.

17. The system of claim 15, wherein minimizing the objective function comprises assigning a value $h_i = f_k/K$ to a hit ratio function $H_i(c)$ responsive to a cache size variable c being in a range of $m_k$ and $m_{k+1}$, where:

$m_k$ is a $k^{th}$ reuse distance value of a plurality of reuse distance values, the plurality of reuse distance values comprising distinctive values of the plurality of reuse distances sorted in an ascending order,
$f_k$ is a size of a reuse distance subset, the reuse distance subset comprising a second reuse distance, the second reuse distance equal to or smaller than $m_k$, and
K is the number of the plurality of reuse distances.

18. The system of claim 13, wherein the method further comprises determining a writing policy for the virtual machine based on the number of the plurality of access sequences.

19. The system of claim 18, wherein determining the writing policy comprises:
calculating the number of the plurality of access sequences $N_A$;
calculating a writing ratio WR for the virtual machine according to an operation defined by the following:

$$WR = \frac{1 - N_A}{N_R},$$

where $N_R$ is the length of the sequence of requests;
setting the writing policy to a write-back policy responsive to the write ratio smaller than a writing threshold; and
setting the writing policy to a read-only policy responsive to the write ratio equal to or larger than the writing threshold.

20. The system of claim 19, wherein determining the writing policy further comprises setting the writing threshold to 0.5.

* * * * *